Sept. 16, 1969   G. G. LANDIS ET AL   3,466,907
METAL RIBBON, WELDING ELECTRODES AND METHOD
AND APPARATUS FOR FORMING SAME
Filed Jan. 3, 1966   5 Sheets-Sheet 1
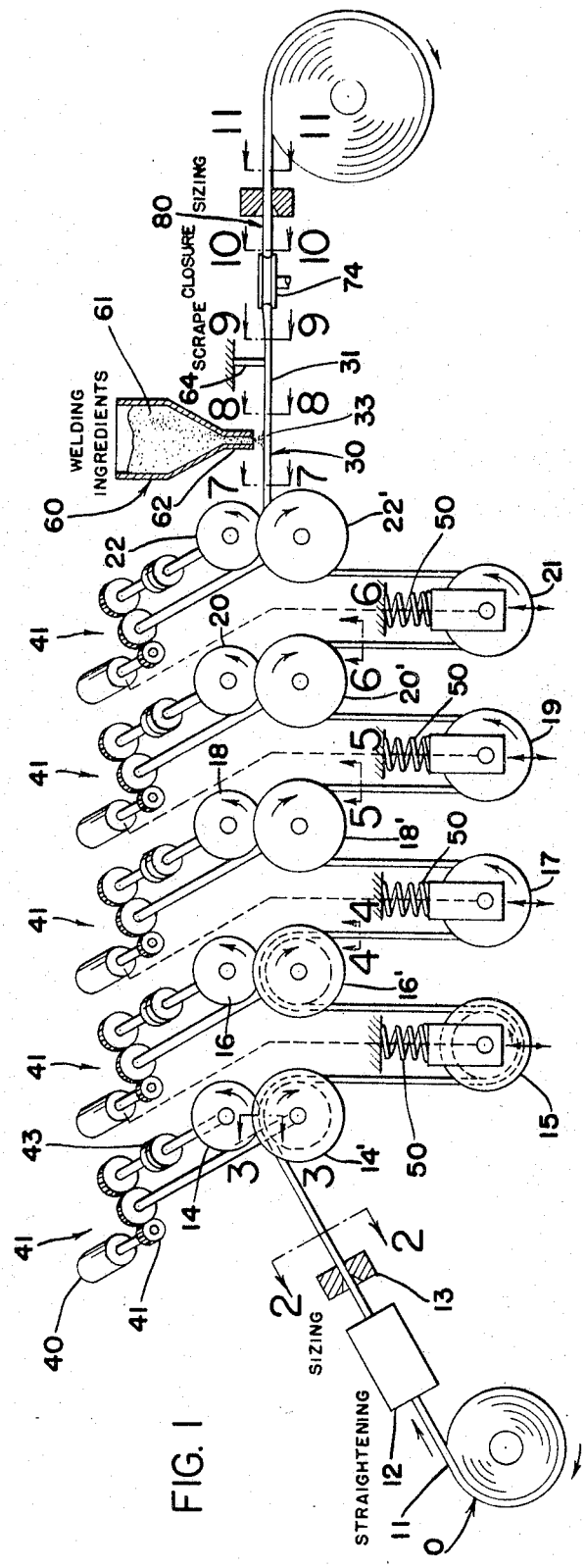
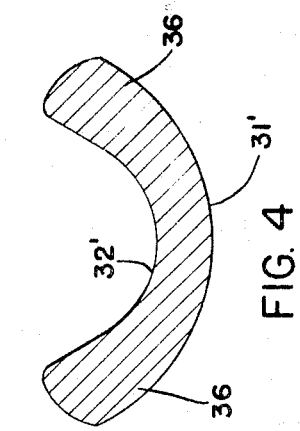
FIG. 4
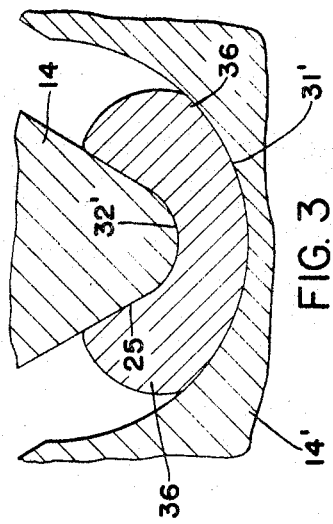
FIG. 3
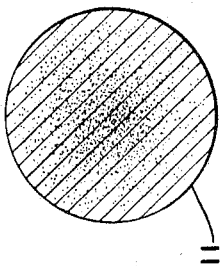
FIG. 2
*INVENTORS*
GEORGE G. LANDIS &
WALTER G. MOSGROVE
BY *Alfred C Body*
ATTORNEY Sept. 16, 1969    G. G. LANDIS ET AL    3,466,907
METAL RIBBON, WELDING ELECTRODES AND METHOD
AND APPARATUS FOR FORMING SAME
Filed Jan. 3, 1966    5 Sheets-Sheet 2
FIG. 5
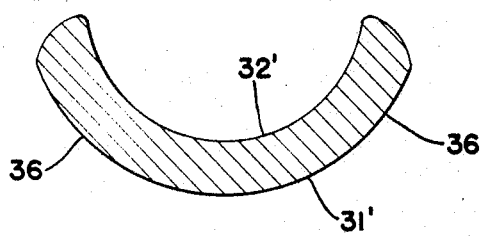
FIG. 6
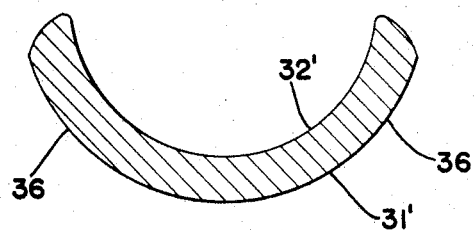
FIG. 7
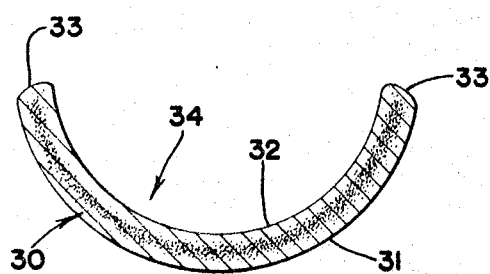
FIG. 8
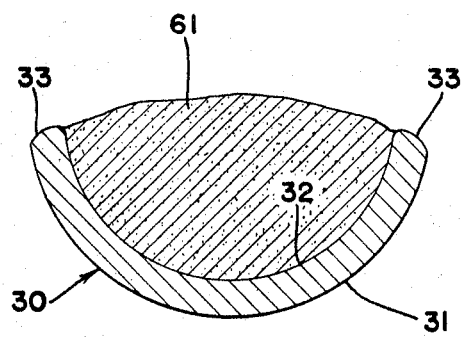
FIG. 9
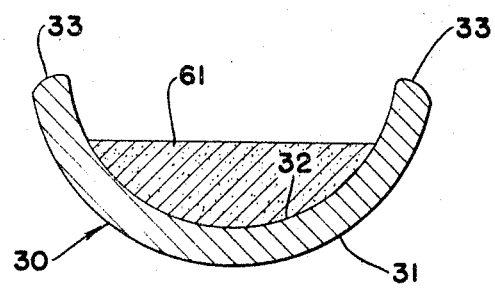
FIG. 10
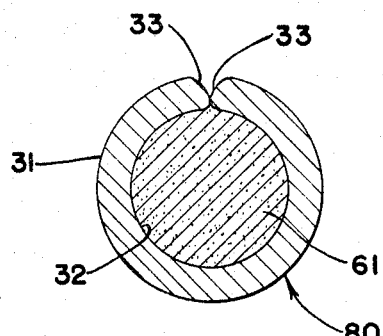
FIG. 11
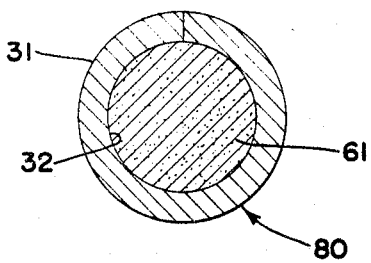
INVENTORS
GEORGE G. LANDIS &
WALTER G. MOSGROVE
BY
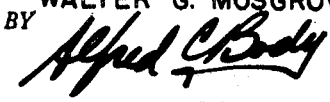
ATTORNEY Sept. 16, 1969 G. G. LANDIS ET AL 3,466,907
METAL RIBBON, WELDING ELECTRODES AND METHOD
AND APPARATUS FOR FORMING SAME
Filed Jan. 3, 1966 5 Sheets-Sheet 5

INVENTORS
GEORGE G. LANDIS &
WALTER G. MOSGROVE
BY
Alfred C. Body
ATTORNEY

United States Patent Office 3,466,907
Patented Sept. 16, 1969

3,466,907
METAL RIBBON, WELDING ELECTRODES AND METHOD AND APPARATUS FOR FORMING SAME
George G. Landis, Pepper Pike, and Walter G. Mosgrove, Willoughby, Ohio, assignors to The Lincoln Electric Company, Cleveland, Ohio, a corporation of Ohio
Continuation-in-part of application Ser. No. 68,771, Nov. 14, 1960. This application Jan. 3, 1966, Ser. No. 537,577
Int. Cl. B23k 35/40; B21d 39/02; B21b 39/08
U.S. Cl. 72—52                                    25 Claims

ABSTRACT OF THE DISCLOSURE

An elongated metal rod is passed through a series of pairs of forming rolls. One roll of each pair has a continuous circumferentially extending groove on its surface, and the other roll of each pair has a narrow portion which enters the groove. The width of each narrow nose portion on successive rolls progressively widens so that the rod is first partially split from one side and the split is then progressively widened until a U-shaped ribbon of uniform thickness and width is produced. The groove of the ribbon is then filled with granular fluxing ingredients and the edges of the ribbon are brought into abutting engagement so as to form a closed tube. The tube is then drawn to a desired outer diameter which tightly compacts the granular ingredients on the inside.

---

This application is a continuation-in-part of our co-pending application Ser. No. 68,771, filed Nov. 14, 1960, now abandoned.

This invention pertains to the art of metal forming and more particularly to apparatus and method for making a metal ribbon, welding electrodes and the resulting product.

The invention is particularly applicable to the manufacture of continuous lengths of metal ribbon and tubular electrodes wherein the hollow of the tube is filled with welding ingredients as set forth in U.S. Patents Nos. 2,-909,778 and 2,909,650 and will be described with particular reference thereto although it will be appreciated that the invention may be applied to other metals, e.g., aluminum.

It has been conventional heretofore to provide the steel of welding electrodes either in the form of a solid cross-sectional wire, a hollow tube, or a flat ribbon.

Solid steel welding electrodes are manufactured from what has become known in the art as "green rod" by drawing the rod to a wire of the desired ultimate diameter and then either cutting the wire to short lengths or winding it into coils.

Steel tube or ribbon electrodes have heretofore been manufactured by taking a wide flat strip of steel of the desired thickness, slitting such strip into ribbons of the desired width, welding the ribbons end to end and, in the case of the tube electrode, forming the joined ribbons into a U-shape and then bringing the edges of the U into abutting or overlapping engagement.

With such a steel ribbon or tube electrode, difficulty has been experienced in obtaining the same metallurgical characteristics over long lengths of the tube and this was so even though adjoining ribbons were slit from the same steel strip rolled from the same steel ingot. Analysis of the problem indicated that the metallurgy of any transverse cross section of a steel ingot varied from the edges of the ingot to the core and from the sides of the ingot to the core; such that a wide steel strip produced from the ingot had a varying metallurgy from one edge to the other. When the strip was slit into ribbons, the metallurgy of the ribbons varied one from the other. These variations, while insignificant for most end uses, were found to be quite significant in the art of welding. These variations could not be readily compensated for by variations in the ingredients placed in the inside of the tube and thus caused unpredictable and undesirable variations in the deposited weld bead unacceptable to the welding electrode users.

Further difficulties from making steel tube out of flat strips slit into ribbons was caused by the inherent variations in the thickness of the flat strip across its entire width, or even along its length. Such variations showed up as variations in the weight of steel per foot of final electrode, both in the individual lengths of ribbon and, particularly, from ribbon to ribbon when the individual lengths were welded end-to-end for processing.

A still further difficulty was in maintaining an accurate width of the ribbon in the slitting operation.

Last, but not least, steel strip from a steel mill on a per pound basis is several times as expensive as green rod on a per pound basis which made steel tube electrodes difficult to sell in competition with the conventional solid steel electrodes.

A still further difficulty in the manufacture of tubular electrodes, and this exists whether the ribbon was formed from green rod or slit from flat strip, is in making the edges of the ribbon remain in firm abutting relationship after the final closure operation. Thus it was found that the edges sprang apart as they left the closure rolls leaving a small gap into the interior of the tube through which contaminants, e.g., moisture or oils, could enter. This opening of the edges occurred regardless of the closing pressure employed.

The present invention overcomes all of the above-referred to difficulties and others and provides a method of and an apparatus for manufacturing metal ribbon and forming such ribbon into continuous lengths of tubular welding electrode which is economical, rapid, gives an electrode which has uniform metallurgical characteristics over long and continuous lengths thereof, and wherein the shape of a tube results in the edges of the ribbon being tightly abutted after the final closure operation.

"Ribbon" as used herein may be a flat or curved narrow strip of metal either of uniform or approximately uniform thickness and width and is used primarily to distinguish from flat strip as it comes from the fabricator and must be slit into ribbons, all as described above.

"Rod" as used in this specification includes a length of metal of dimensions and/or a weight per foot greater than that of the final ribbon, such rod is usually and preferably cylindrical in cross-sectional shape but in some instances it could be square, or polygonal.

"Green rod" is a rod formed from an ingot or billet by a process of hot rolling, forging and/or drawing to simultaneously reduce the transverse dimensions of the ingot or billet and increase the longitudinal dimension by a corresponding large amount. A cross-sectional piece of green rod has the same variations in chemical composition from the outer surfaces to the center core as did the original ingot, and by the same token, the total chemistry of any cross-sectional piece taken from any portion of the length of the rod is the same as the corresponding portion of the steel ingot. Such rod is in the hot rolled condition and thus is the equivalent of a fully annealed rod.

In the case of steel it is known that a green rod will have an outer skin of lower alloy steel and freer of inclusions than portions inward of the skin to the center of the core. This outer skin is uniform in its chemistry around the entire circumference of the rod. It is also known that approximately the bottom 15% and the upper 15% of the length or height of a steel ingot may have a metallurgy which differs appreciably from the intermediate 70% of the ingot length and if this variation is detrimental for welding electrodes, the present invention preferably uses green rod manufactured only from the intermediate 70% of the steel ingot. The upper and lower 15% may either be cropped off prior to the reducing operation or after the rod or wire has been formed. Such upper and lower 15% may be employed for making conventional solid steel welding electrodes wherein the metallurgy of the steel itself is not as critical.

Rod has heretofore been formed into a ribbon of uniform thickness by simply passing it through a series of axially flat rolls until the desired end thickness is obtained. However, and significantly in relation to the present invention, such a procedure does sufficient cold work on the steel as to require one or more annealing operations prior to obtaining a finished product of a thickness which can be used in a welding electrode, particularly of the steel tube type. Also such a procedure principally affects the reduction in thickness by an axial or longitudinal elongation. If the ultimate product is to be a tube then the elongation must be in a transverse direction so as to produce a ribbon of appreciable width.

In accordance with the broadest aspect of the present invention, a method of manufacturing metal ribbon is provided comprising: providing a rod and progressively reducing selected portions only of such rod in thickness until all portions have a uniform thickness.

In accordance with a somewhat narrower aspect of the invention, there is provided a method of manufacturing metal ribbon comprising the steps of providing a rod, continuously forming a longitudinally extending symmetrical groove therein and thereafter continuing the forming operations to widen and deepen such groove utnil the rod is in the shape of a ribbon having a uniform wall thickness and width. It has been found that by first forming a longitudinal groove in such rod, that the ribbon may be formed by a series of cold working operations without any intermediate annealing operations on the metal. The invention does not exclude such annealing operations, however.

In effect, this narrower aspect of the invention contemplates a step of partially splitting the rod on a diameter into two generally symmetrical portions integrally joined and thereafter forming such portions into the V or U-shaped ribbon of uniform thickness from edge to edge and of a uniform width over its entire length.

In a still further limited aspect of the invention, after each forming operation on the metal except the last, the thickness of the metal from the center longitudinal plane increases progressively to the edges, the rate of increase after each forming operation decreasing progressively until after the final forming operation when the thickness is uniform transversely across the ribbon. With this arrangement, a greater reduction of thickness in each pass may be obtained with less power, less physical strain on the forming rolls, fewer passes and less breakage of the forming rolls.

This is done by providing sets of forming rolls preferably having peripheries with mating V-grooves and V-cross-sections with the included angle of the V's of progressive sets of rolls being so related as to provide the desired decrease in the rate of increasing thickness from the longitudinal center plane of the partially formed ribbon.

In an alternative limited aspect of the invention, each successive forming operation after the initial splitting operation reduces the metal to approximately the finished thickness in progressive steps from the center plane of the split rod outwardly to the edges. That is to say, the center portion of the split rod is reduced to first approximately the final thickness in the first forming pass while no reduction in thickness is performed on the edges. Thereafter an adjacent portion outwardly in both directions from the center portion are reduced to approximately the final thickness without appreciable reduction of either the center portion or adjacent outer portions. This is repeated progressively outwardly until all portions are reduced to final thickness. It is to be noted that the reducing operations on the outer portions do tend to strech and elongate the already formed inner portions and effect a slight reduction in thickness thereof.

Importantly as a result of the invention, the thick edges of the split rod restrain the center portion from elongating longitudinally as it is being reduced in thickness such that its primary elongation is transverse. Thereafter, the cold worked center portion restrains the outer portions as they are being reduced in thickness from longitudinal elongation such that the elongation is primarily transverse. A maximum ratio of transverse elongation to longitudinal elongation results, i.e., a maximum width of finished ribbon for a given diameter of rod.

Still further and importantly, a method of forming a metal ribbon into a tube is provided wherein just prior to the final forming operation, the radius of the curvature of portions of the ribbon remote from the edges, e.g., the apex of the V or U is less than the radius of curvature of the walls of the final tube such that the final closing operation on the tube increases such radius by at least a small amount. The effect is to circumferentially elongate or stretch the metal on the inside of the tube leaving it in a state of circumferential tension which holds the edges of the ribbon together. This feature is in contradistinction to prior practices where the final closing step decreased the radius of curvature with the result that the metal on the inside of the tube opposite the edges was in a state of circumferential compression. When the closing force was removed, the edges opened up to relieve this compression.

Still further in accordance with the invention, the ribbon just prior to the final forming operation is in the general shape of a U with the walls diverging from the apex at a predetermined angle of divergence and with the ends of the legs diverging at a lesser angle or even parallel. This arrangement facilitates the closing of the U ribbon into a cylindrical tube with the edges of the ribbon in firm abutting engagement.

One of the problems encountered in the forming of rod into a U-shaped ribbon was in preventing the rod on the first pass from turning or twisting about its axis relative to the forming rolls and insuring that the rod is accurately split on a center plane. In accordance with this phase of the invention a grooved and nosed roll are provided and the rod engages the base of the grooved roll before it is engaged by the tip of the nosed roll.

Further, the groove has essentially the shape of a V with straight side walls and the radius of the apex of the V is less than the radius of the rod. The rod, as can be seen from the geometry, engages the V groove surfaces at two points, each equally spaced on either side of the center plane of the male forming roll. The line of force of the male roll is between these two points and the rod is held accurately during the splitting operation.

Alternatively or additionally, the rod is wrapped around the grooved roll for an arcuate length of at least 45°. The maximum angle of wrap is only limited by the need for clearance between entering and exiting rod.

Steel articles, e.g., wire, manufactured by rolling or forging an ingot to a smaller diameter, e.g., a green rod, and then drawing to a still smaller diameter may be readily identified as to the method of manufacture by a microscopic examination of a cross section of the article. Thus ingots, as are known, generally have a surface of relatively lower alloy content and of relatively lesser inclusions than the inner portions or core of the ingot which inclusions and alloy content normally increase progressively from the outer surface of the ingot to the center. Stated otherwise, the surface or skin has a lower alloy content and this alloy is generally the same around the entire periphery of the ingot. By alloy is meant any element which alloys with iron either advantageously, e.g., carbon, manganese, or disadvantageously, e.g., sulphur. These characteristics remain notwithstanding any amount of rolling or forging, either hot or cold, and may be readily identified under a microscope. In particular, if the method of manufacture involved a cutting or a slitting operation, this may readily be seen by abrupt changes in metallurgy or chemistry, particularly at some surface on the article.

In accordance with the present invention, a steel tube electrode is provided formed from a ribbon with the edges disposed so as to close the tube, the surfaces of the ribbon (including the surfaces of the edges) having all or either: (a) the same chemical composition, (b) a lower alloy content than the inside of the ribbon, or (c) a metallurgy varying from a relatively lower alloy iron and inclusions to a maximum alloy and inclusions intermediate the surfaces, that is to say, the variations in the metallurgy of the walls of the tube vary proportionately with the variations in the metallurgy of the original ingot from its outer surface to the center core.

The principal object is the provision of a new and improved method of manufacturing metal ribbon at a cost less than that of slitting metal strip.

Another object is the provision of a new and improved method of forming rod into ribbon which gives a maximum width to initial diameter ratio and a minimum thickness to initial diameter ratio without the need for annealing.

Another object of the invention is the provision of a new and improved welding electrode which has uniform welding and metallurgical characteristics over long continuous lengths thereof.

Another object of the invention is the provision of a tubular welding electrode which is cheaper to manufacture than previous tubular electrodes made from metal strip slit into ribbons.

Another object of the invention is the provision of a new and improved method and the shape of forming rolls therefor which prevents a rod from turning and twisting about its axis during forming operations thereon.

Another object of the invention is a new and improved method of forming metal ribbon into a closed tube which insures that the edges of the ribbon will be in tight abutting engagement.

Another object of the invention is the provision of a new and improved female forming roll for forming rod into a ribbon having a groove shape such as to accurately rotate and hold the rod relative to the center plane of a male forming roll.

Another object is the provision of a new and improved method and an arrangement of forming rolls therefor which effectively prevents the rod from twisting about the axis.

Still another object of the invention is the provision of a new and improved arrangement for accurately locating rod during a splitting operation thereon.

Another object of the invention is the provision of a new and improved apparatus for forming rod into a tube which prevents twisting or turning of the green rod about its axis during the forming operation, and which is able to automatically take up slack, compensate for differences in the speed of movement of the green rod through the forming rolls and maintain the rod continuously under tension during the forming operation.

Still another object of the invention is the provision of a new and improved tube electrode which has uniform metallurgical characteristics in a circumferential direction and wherein the wall metallurgy varies from a lower alloy iron on the outside of a higher alloy iron on the inside.

A still further object of the invention is the provision of a method forming rod into a U or V-shaped ribbon in a minimum of forming passes and at a minimum of cost.

The invention may take physical form in certain parts and arrangements of parts and certain steps and combinations of steps, the preferred embodiments all of which will be described in detail in this specification and illustrated in the accompanying drawing which is a part hereof and wherein:

FIGURE 1 is a somewhat schematic side elevational view of apparatus embodying the present invention for carrying out the method and for manufacturing welding electrodes in accordance with the present invention;

FIGURES 2–11 are cross-sectional view showing the various shapes assumed by the rod as it passes through the apparatus of FIGURE 1 and is formed into a tube electrode having the hollow thereof filled with welding ingredients, all illustrating preferred embodiments of the invention; and FIGURES 12–15 are views similar to FIGURES 2–11 but showing an alternative embodiment of the invention where the same total reduction may be obtained in three passes through the rolls;

Figure 12:
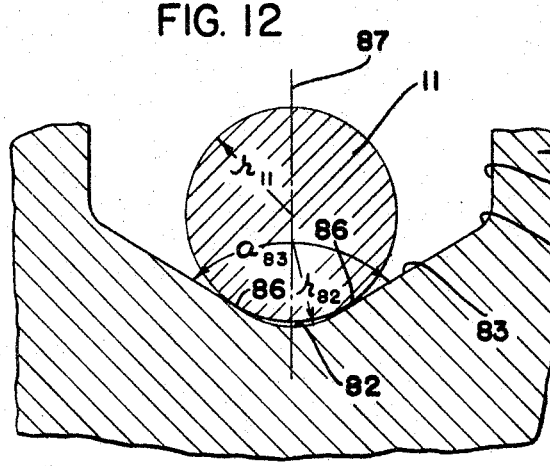

Referring now to the drawings wherein the showings are for the purposes of illustrating preferred embodiments of the invention only and not for the purposes of limiting same, FIGURE 1 shows a roll or coil 10 of rod 11 being advanced from left to right through metal working apparatus including straightening rolls 12; a sizing die 13; a pair of upper and lower forming rolls 14 and 14'; an idler roll 15; a second pair of upper and lower forming rolls 16 and 16'; and idler roll 17; a third pair of upper and lower forming rolls 18 and 18'; a third idler roll 19; a fourth pair of upper and lower former rolls 20 and 20'; a fourth idler roll 21; and a fifth pair of upper and lower forming rolls 22, 22'; the green rod emerging from the forming rolls 22, 22' now in the form of a U-shaped ribbon 30 having an outer, lower and convex surface 31, edges 33 and an upper and inner concave surface 32 defining an upwardly facing channel 34.

Obviously, more or less pairs of forming rolls may be employed, it having been found that five pairs are sufficient to change the shape of the rod 11 to the final desired shape shown in FIGURE 7.

The rod 11 may be of any metal capable of being cold worked but in the preferred embodiment is fully annealed steel in the form of green rod. Hot rolled rod usually has a nonuniform diameter and its cross-sectional shape is usually slightly noncircular. The sizing die 13 gives the rod a uniform diameter and a true circular shape.

In the preferred embodiment of the invention shown, each of the lower forming rolls is provided with a groove having the same radius of curvature as the desired radius of curvature of the surface 31 of the final ribbon 30.

Each of the upper forming rolls, however, has a forming lobe or tongue of differing shapes such as to progressively form the rod 11 into the various shapes shown in FIGURES 3–7. Each pair of rolls is driven by a separate variable speed electric motor 40 through suitable speed reducing gear trains 41. Each upper forming roll is driven nominally at the same rotational speed as its corresponding lower forming roll as is conventional. A slip clutch 43 is shown. A differential may also be employed. Either permits the rolls of any one pair to rotate at slightly different speeds necessitated by the fact that the two rolls are each in engagement with the rod over a range of diameters and the effective diameter of one roll in engagement with the rod may not be exactly the same as the effective diameter of the other. Each upper roll of each pair is mounted as is conventional and thus not shown for radial adjustment towards and away from the lower roll of each pair whereby the deformation or amount of work done on the rod 11 as it passes through each pair of rolls may be readily adjusted.

The tongue or lobe of the various upper rolls may take a number of different shapes, it being important insofar as the invention is concerned, that the first tongue or lobe 25 of the first roll 14 have a shape such as to form a longitudinally extending notch or groove in the rod defined by an upwardly facing concave surface 32' and dividing the rod into what may be called "two symmetrical portions" 36 of a generally indeterminate shape. The V-shape with the rounded nose shown of the lobe 25 is important and a preferred shape over a U-shape of lobe because it gives less longitudinal elongation of the rod and also enables a greater ultimate width of ribbon 30.

The lower surface 31' preferably has a radius of curvature throughout the forming operations corresponding to the final desired radius of curvature of the ribbon 30.

Thereafter the subsequent forming rolls both deepen the groove and widen it until the rod has been formed into a ribbon of generally uniform thickness. Such uniform thickness is important if the ribbon 30 is to be subsequently formed into a steel tube. Improved welding characteristics result.

In the embodiment of the invention shown, the working space of the pairs of forming rolls are all on the same horizontal line, while the idler rolls 15, 17, 19 and 21 are all offset below this horizontal line so that as the rod leaves the first pair of forming rolls 14, 14', it is wrapped around the lower forming roll 14' through an arc of approximately 90°. The rod is then bent around the idler roll 15 in the opposite direction for approximately 180° of wrap and thence again is bent in the opposite direction to pass around the lower forming roll 16' and while it is so wrapped, the upper forming roll 16 performs its forming operation, etc. Thus in accordance with the invention, as the rod leaves the forming rolls 14, it is wrapped around the forming roll in accordance with the invention for at least an angle of 45°. As the rod passes around the lower forming roll 16", it will be seen that in accordance with the invention, the rod is wrapped around the forming roll before, during and after the forming operation of the upper forming roll 16. Also the rod approaches the first set of rolls from such an angle that the rod bottoms in the groove before it is contacted by the upper roll.

By such means, the rod is kept from twisting or turning about its axis as it passes through the various forming rolls.

It will be appreciated that this same wrap could be obtained by eleminating the idler rolls 15, 17, 19 and 21 and offsetting the pairs of forming rolls from the horizontal line through the point of forming of the rod. For example, the pairs of forming rolls 16, 16' could be positioned in the same location as the idler roll 15, although in such event, it would be preferred that the upper forming roll be the grooved roll.

The idler rolls 15, 17, 19 and 21 are preferred, however, and they also perform an additional desirable function. Thus, each of the idler rolls 15, 17, 19 and 21 are vertically movable, but are biased in a direction away from the horizontal line through the forming rolls by means of heavy springs 50, such springs being shown schematically. Changes in the length of the rod between the forming rolls and the idler rolls brought about as a result of imperceptible variations in the speed of the motors 40 or in changes in the amount of elongation of the rod at the various points of deformation or both will cause the idler rolls 15, 17, 19 and 21 to move vertically against the pressures of the springs 50. Such vertical movements are translated through convention control apparatus into a variable supply voltage for the drive motor 40 immediately following the idler, the arrangement being such that if the length on the rod around a particular idler roll tends to decrease to raise an idler roll, the voltage to the drive motor for the next following roll is changed in a sufficient amount to lower its speed and increase the length and vice versa.

In this manner, any slack which might develop in the apparatus is automatically controlled.

Also in accordance with known practices, all of the motors 40 are controlled from a single master control so that the speed of movement of the rod through the apparatus may be readily controlled dependent upon conditions and the desire of the operator.

It will be noted from an examination of FIGURES 2-7 that the forming operation substantially reduces the cross-sectional area of the rod. A major portion of the deformation is longitudinal elongation of the rod. However, as will be seen from an inspection of FIGURES 3-7, there is also an increase in the circumferential width of the rod as it passes through the various forming operations.

By properly controlling the shape of the various tongues on the forming rolls, a ribbon of uniform width may be readily obtained. However, if desired, the various forming rolls may be so arranged as to positively limit the circumferential width of the rod at the various stages or of the final ribbon produced.

Referring now to FIGURE 2, the rod shown has been hatched to show the known metallurgical variations from the surface of a green rod towards the core, it being known that the surface or skin of such a rod is of a relatively pure steel with the alloy elements and inclusions abruptly from the surface and then increasing gradually towards the center. This outer layer of relatively purer iron is softer usually than the metal of the core and assists in maintaining the life of the forming rolls, it being noted that at no time during the forming operations of the green rod 11 into the ribbon 30, is there any shearing action or cutting into the inside of the green rod. Thus the upper surface 32 and the lower surface 31 are still the equivalent of the outer surface of the green rod 11. Thus, the metallurgy of the ribbon 30 will vary from a generally purer iron on the surfaces 31, 32 and edges 33 to a higher alloy inclusions on the inside of the ribbon spaced from the surfaces 31, 32.

It is to be noted that in the forming of the ribbon 30 from the green rod 11, no annealing steps are shown or have been found necessary. In this respect, it is to be noted that the green rod 11 is normally hot rolled and hot drawn from the steel ingot to the final diameter and thus as delivered to the weld rod manufacturer is in a normally soft or dead-soft condition. If the rod is not in such condition, it is preferably annealed at this point before it is fed into the apparatus described.

The apparatus shown in FIGURE 1 also includes means for filling the channel of the ribbon 30 with a predetermined amount of welding ingredients and thereafter forming the ribbon 30 into a steel tube with the welding ingredient from the inside.

As shown in the figures, the apparatus includes a hopper 60 filled with welding ingredients 61 and having a dispensing spout 62 located directly over the path of movement of the ribbon 30. This hopper is arranged to fill the channel of the ribbon 30 with the welding ingredients 61 in an excessive amount. Means which are conventional, e.g., a scraper 64 removes the excess of such ingredients leaving a predetermined amount.

Thereafter the ribbon 30 is closed into a tube. Thus, the apparatus also includes a pair of rolls 74 which roll the ribbons shown in FIGURE 9 with the predetermined amount of flux 61 held in the channel into a tube 80 with the predetermined amount of welding ingredients 61 left in the channel of the ribbon 30 by bringing the edges 33 into abutting engagement.

It is to be noted that the edges 33 at this point are generally somewhat rounded. The tube 30 is thereafter passed through a sizing die such as to bring the rounded edges 33 into sufficient pressure engagement that they are deformed an amount so as to abut across their entire width.

Using the present invention, it has been found possible to take rod which is far less expensive on a per pound basis than steel strip and form such rod into a U-shaped ribbon, fill the ribbon with welding ingredients, form the ribbon into a tube, all at a price per pound of electrode far below that which the same tube would cost if made from steel strip and with a highly improved uniformity of welding characteristics.

The apparatus shown in FIGURE 1 has only been shown in a schematic manner. It is believed that the straightening rolls 12, the sizing die 13, the arrangements for driving and mounting the forming rolls, the mounting for the idler rolls 15, and electrical connections between the position of the idler rolls 15, and the forming roll for controlling the speed of the motors 40 are all within the skill of the metal-forming art and have not been described in complete detail herein.

The principal inventive features for the apparatus described are believed to be the offsetting of the various rolls so that the rod as it passes over the forming roll is prevented from twisting about its longitudinal axis by virtue of the rod being moved through an arc of at least 45° either before, during or after each forming operation.

Insofar as the method is concerned, it is believed that we are the first to have ever formed rod into a ribbon for the purpose of making welding electrodes. It is to be noted that by such a method, the cost of the ribbon per pound is substantially reduced from anything known heretofore and also uniformity of thickness, width and metallurgical characteristics of the ribbon may be assured over long continuous lengths.

In this respect, it is to be noted that in the prior art, the maximum length of strip obtainable from a given ingot may be only on the order of 2000 feet, which strip is slit into ribbons and welded end-to-end. The resultant ribbon then would have the same continuous length as a ribbon formed from rod formed from the same ingot, but would have welds every 2000 feet or so and would have potential variations in metallurgy and thickness and width every 2000 feet.

The various cross-sectional shapes which the metal will take in the embodiments of the invention just described require five forming passes to go from a round green rod to a ribbon of uniform thickness from edge to edge. It is to be noted that in this embodiment the groove shape of all the lower forming rolls is round and some difficulty was experienced in accurately centering the rod relative to the first upper forming or splitting roll 14 so that the rod would be equally split or divided.

FIGURES 12–18 show an alternative arrangement for the shapes of the forming dies which insures that the rod on the first splitting or forming operation will be accurately located relative to the splitting roll and also enables the rod to be reduced from the round cross-sectional shape to a ribbon shape in a total of three forming operations.

In this embodiment of the invention, the lower or female forming dies are all generally identical and as particularly shown in FIGURE 12, have a generally V-shaped groove defined by a curved apex 82 blending tangentially and smoothly into generally flat diverging side walls 83 which in turn at their outermost edges blend through a tangential curved surface 85 into vertically extending side walls 84 spaced a distance $W_{84}$. FIGURE 12 shows a rod 11 before any forming operation has been performed thereon positioned in the groove of the lower forming roll. It is to be noted that the radius $r_{82}$ of the surface 82 is less than the radius $r_{11}$ of the outer periphery of the rod 11. Also and importantly, for reasons which will appear, the radius $r_{82}$ is less than the radius of the tube to be finally formed. Thus the outer surface of the rod 11 engages the surface 83 at two points 86 equally spaced on either side of the center line 87 on the groove in the roll and is spaced from the apex 82.

The first upper forming roll 90 may be termed a splitting roll and engages the upper surface of the rod 11 on this center line 87 and the force is transmitted through the rod 11 to these points 86 which are sufficiently spaced apart as to maintain the rod 11 accurately located about the center line 87. This roll 90 has a generally V-shaped cross section having a curved apex 91 blending tangentially into generally flat diverging side walls 92 and in accordance with the invention, the included angle $a_{92}$ between the side walls 92 is substantially less than the included angle $a_{83}$ between the side walls 83 of the lower forming roll groove. The splitting roll 90 essentially forms a notch in the rod 11 dividing it into a V-shaped rod 94 having legs the thickness of which progressively increase upwardly and outwardly from the apex of the V. The upper edges 96 of the legs have a generally curved shape, as is shown, which shape at this point is relatively unimportant.

It is to be further noted that the splitting roll 90 forces the lower surface of the rod 11 into firm engagement with the curved surface 82.

Figure 13A:
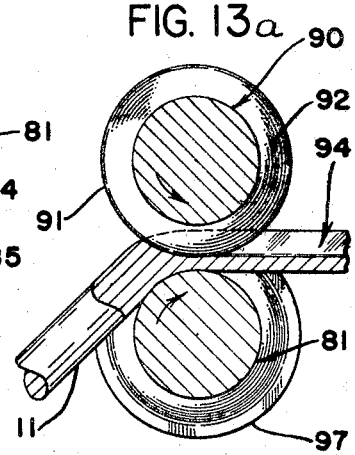
Figure 13:
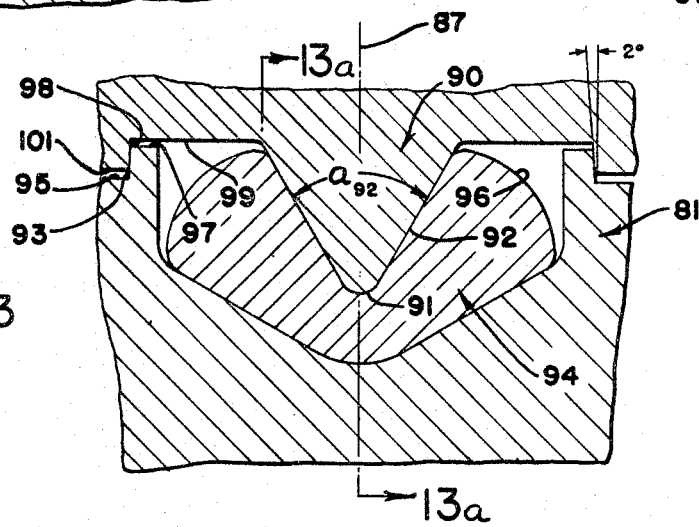

It is important that the first upper forming roll 90 be extremely accurately located about the center line 87 for the reason that any inaccuracies at this point result in unequal amounts of metal in each of the legs 94 and these inequalities are practically impossible to eliminate by subsequent cold working. The present invention thus provides for accurately locating the upper forming roll 90 in an axial direction relative to the lower forming roll 81. Thus as is shown in FIGURE 13, the lower forming roll 81 has a pair of axially spaced circumferentially extending surfaces 93 facing away from the center line 87 and forming a shoulder between two radially facing surfaces 95, 97. In a like manner, the upper forming roll 90 has an axial width so as to extend axially beyond the surfaces 93 and has a pair of axially spaced circumferentially extending surfaces 98 facing toward said center line 87 and forming a shoulder between radially facing peripherial surfaces 99, 101.

The surfaces 93, 98 are each located equidistant from the center line 87 and have a slight taper, e.g., 2°, from the radial plane such that the surfaces are in a slight wedging relationship relative to each other to firmly lock the upper and lower forming rolls 90, 81 against any relative axial movement whatsoever. The engagement of these surfaces also determines the spacing of the apex 82. It is to be noted that the surfaces 93, 97 are spaced from their opposite surfaces 101, 99 respectively.

It is further important that the rod 11, before it is engaged by the upper rolls 90, have a partial wrap around the roll 81. This arrangement is shown in FIGURE 13a wherein the rod 11 approaches the roll 90, 81 so as to becom tangent with the roll 81 prior to the point in its longitudinal movement where it is engaged by the apex 91. Thus, at this time, the rod 11 has been bent to conform to the curvature of the groove in the lower forming roll 81 and in contact with the point 86. With this arrangement the rod is firmly based and located in the groove before being contacted by the nose of the other roll. By properly guiding the rod into the first set of forming rolls and accurately positioning the first set of forming rolls axially relative to each other, it is possible to accurately split the rod 11 into a V with symmetrical legs and thereafter the subsequent sets of forming rolls may float axially relative to each other.

Figure 14:
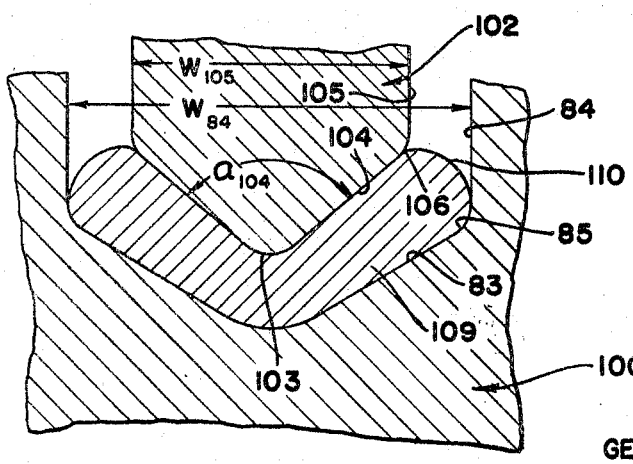

The second set of forming dies and their relationship are shown in FIGURE 14. The lower forming roll 100 is identical to the forming roll 81. The upper forming roll 102 is generally V-shaped in cross section and has a curved apex 103 blending tangentially into generally flat side walls 104 which in turn blend into generally vertical side walls 105 through a radius 106.

In this embodiment of the invention, it is to be noted that the included angle $a_{104}$ between the side walls 104 is greater than the included angle $a_{92}$ but is still less than the included angle $a_{83}$. Thus, the second set of forming rolls widen out the V formed by the splitting roll 90 and further force the metal 109 sidewardly along the surfaces 83 and into engagement with the curved surface 85 and possibly with the vertical surface 84 of the groove. In this respect and at least on this second forming roll, the width $w_{84}$ between the walls 84 is carefully controlled in relation to the width $w_{105}$ between the surfaces 105 of the second upper forming roll 102 so as to allow room for the metal to flow laterally.

As a result of this forming operation, the overall thickness of the metal 109 of the rod is further reduced so that the legs of the V have a gradually increasing thicknes upwardly from the apex to the upper edges 110.

The important thing about the cross-sectional shape of the metal 109 is that the legs increase in thickness away from the apex of the V, but at the rate which is less than the rate of increase of thickness of the legs as they leave the first set of forming rolls. The purpose of this arrangement and dimensioning is so that the metal will be able to flow readily laterally without excessive friction, i.e., being pinched between the surfaces of the two forming rolls. This is an important aspect of this embodiment of the invention and is one of the reasons why it is possible to effect such large reductions in the metal thickness in the minimum number of passages and with a minimum stress on the forming rolls.

In the third set of forming rolls, the lower forming roll 115 is identical to the forming roll 81. The upper forming roll 116 has a generally curved apex 117 blending tangentially into generally flat side walls 118 which in turn blend into vertically extending side walls 119 through a radius 120. In this embodiment of the invention, the width $w_{119}$ between the side walls 119 is important and must be carefully controlled in relation to the width $w_{84}$ and also to the vertical spacing of the roll 116 from the base of the groove in the roll 115 so that the metal 125 forming the ribbon will have a uniform thickness from edge to edge. In this respect, it is to be noted that the included angle $a_{118}$ is equal to the included angle $a_{83}$. Also, the radius of curvature of the curved surfaces 120 and 117 must be carefully related to the radius of curvature of the surfaces 85 and 82 to obtain the desired uniform thickness of the metal 125.

It is to be noted that the metal 125, in accordance with the definitions heretofore set forth is a ribbon having a generally V-shape including an arcuate apex 130 and generally straight legs 131 terminating at their outer ends in a curved portion 134 and vertically upstanding ends 132 having edges 133 to be brought into abutting engagement as will appear.

It will thus be seen that the rod 11 has been reduced to a ribbon of uniform thickness but of a general V shape by the use of three sets of forming rolls, or that is to say, three passes.

As the metal ribbon 125 leaves the third set of forming and reducing rolls, it then passes through three sets of closing rolls which, in accordance with the invention, first form the ribbon into a C shape with the radius of curvature of the inside apex of the C less than the radius of the inside apex when the ribbon is closed into a tube and then bring the edges of the ribbon into firm abutting engagement. By the term "apex" as used herein is meant a point on the ribbon on the C or on the final tube equally spaced from the edges 133.

Figure 16:
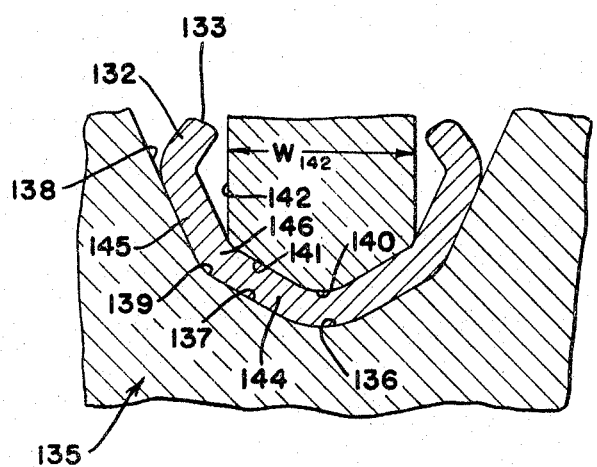
FIGURES 16–18 are views similar to FIGURES 12–16 but showing the closing rolls.

While the closing rolls may take a number of different forms, in the preferred embodiment the ribbon with its edges on top is passed through a first set of closing rolls, which, as shown in FIGURE 16, include a lower female roll 135 having a generally V-shaped groove defined by an arcuate apex 136 blending tangentially into flat diverging side walls 137 which in turn blend through a radius 139 into flat side walls 138 which diverge at a somewhat lesser angle. The radius of curvature of the apex 136 and the included angle between the side walls 137 are the same as on the other lower forming rolls described herein above.

Figure 15:
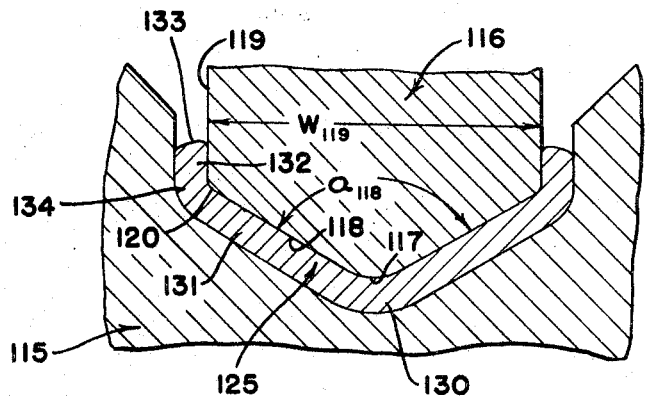

The upper closing or male roll has an arcuate apex 140 which blends into generally flat diverging side walls 141 and then into parallel side walls 142 having a width therebetween in relation to the spacing of the radii 139 such that the legs 131 of FIGURE 15 will be bent midway along the length into inner and outer straight portions 144, 145 joined by an intermediate curved portion 146. This forming operation brings the edges 133 inwardly towards each other such that they just touch the side walls 142.

Figure 17:
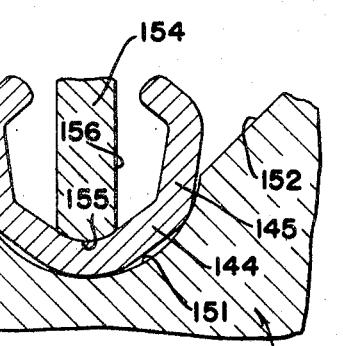

The second set of closing rolls, as shown in FIGURE 17, include a lower female closing roll 150 having a groove therein defined by a generally arcuate side wall 151 having an arc somewhat less than 180° terminating in diverging side walls 152 which serve to guide the ribbon to the arcuate groove. The upper or male forming roll 154 has an arcuate apex 155 and parallel side walls 156 which are spaced apart a distance substantially less than the spacing of the side walls 142 of FIGURE 16. The radius of curvature of the apex 155 is slightly less than the radius of curvature of the apex 140 while the radius of curvature of the wall 151 is less than the spacing of the radii 139. The roll 154 pushes the ribbon into the groove of roll 150, descreasing the radius of curvature of the inside apex and partially curving the walls 144 and 145 of FIGURE 16. The overall result of this forming operation is to bend the sides 144 midway of their length and bring the edges 133 into a more closely spaced relationship and with the ends 132 tapering inwardly and upwardly towards each other in an amount limited only by the width of the male closing roll 154.

This closing step insures that the inside apex radius will be less than that of the final tube inside apex radius. Generally, the ribbon 125 may be described as C-shaped with the edges slightly spaced.

The C-shaped ribbon 125 with its edges on top is then passed through suitable apparatus, not shown, for filling the interior with suitable welding ingredients such as those describe in U.S. Patents No. 2,909,778 and 2,909,650 owned by the Assignee of this application.

The C-shaped ribbon then passes through the final closing rolls.

Figure 18:
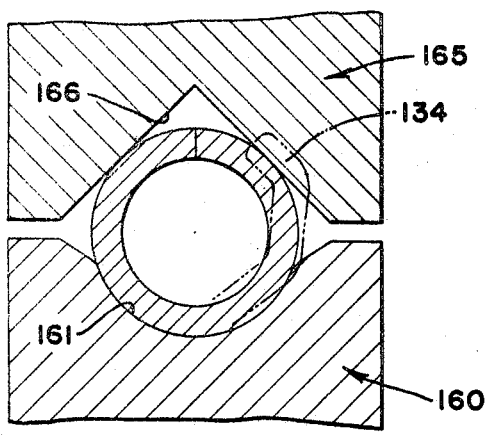
Figure 19:
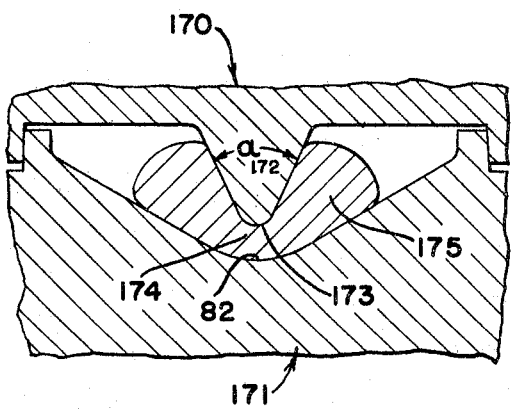
FIGURES 19–22 are views similar to FIGURES 2–11 but showing a still further alternative embodiment of the invention.

The final closing rolls, as shown in FIGURE 18, include a lower female roll 160 having a groove defined by generally arcuate side walls 161 having a radius of curvature equal to the desired radius of curvature of the outside of the final tube, but in any event, having a radius of curvature at the apex such that as the tube is closed, the radius of curvature at the inside apex will be increased. Thus, and in accordance with the present invention, increasing the radius of curvature of the inside apex elongates or stretches the metal at the inside apex so that when the closing operation is completed, the metal at the inside apex will have residual tension forces therein tending, when the closing force of the rolls is removed, to bias the edges 133 into firm abutting engagement.

The upper closing roll 165 has a generally V-shaped groove therein defined by a pair of diverging side walls 166 which engage the curved portion 134 forcing the partially closed U into the groove of the lower forming roll and at the same time exerting a wedging and closing effect on the edges 133 to bring them into firm, abutting engagement. The compression forces of the closing roll also force the outer side walls of the metal into firm, abutting engagement. The compression forces of the closing roll also force the outer side walls of the metal into firm engagement with the arcuate surface 161 such that the flat side wall portions 144 and 145 of FIGURE 17 will be rounded out to conform with the radius of curvature of the surface 161.

It is to be noted that heretofore in the closing of ribbon into a hollow tube it was conventional to decrease the radius of curvature at the inside apex in the final closing operation, which placed the metal at the inside apex in compression so that when the closing force was removed, the locked-in compressive stresses in the metal caused the edges to open slightly. Using the present invention, however, the residual strain on the inside apex is a tension which exerts a closing action on the edges. This closing action remains even after the now closed tube leaving the die of FIGURE 18 is passed through conventional sizing dies and the danger of contaminants, for example, lubricants used on the sizing dies, being forced into the interior of the tube, is alleviated.

FIGURES 19–22 show a still further alternative embodiment of the invention for rolling a rod generally to the shape of the ribbon 125 of FIGURE 15. In this embodiment of the invention, at least after the initial splitting operation, each forming operation reduces the thickness of the rod on portions of limited width only commencing with the apex portion and then on portions working progressively to the outer edges of the ultimate ribbon. Thus, each forming operation reduces its portion to approximately the final or ultimate thickness and thereafter no further appreciable reducing is done on that portion.

In this embodiment of the invention, the lower forming rolls in each instance preferably, although not necessarily, have the same shaped groove and this groove is preferably the same as that shown for the groove in FIGURES 12–15. Accordingly, like numerals will be used to refer to like surfaces.

The first pair of forming rolls include an upper splitting roll 170 and a lower grooved roll 171. The upper roll 170 is generally identical to the roll 90 of FIGURE 13 with the exception, and preferably, that the angle $a_{172}$ of divergence between the side walls 172 is somewhat less than the angle $a_{92}$. Preferably, this angle $a_{172}$ is made as small as possible taking into consideration the problem of breakage of this roll. By holding the angle $a_{172}$ to the minimum it is possible to split the rod with a minimum longitudinal elongation thereof. This is desirable because one of the problems of forming rod into a hollow tube for welding electrode is to obtain a sufficient width of ribbon. Another problem is to obtain a ribbon which is sufficiently ductile such that after the ribbon is formed into a tube, the tube may be passed through the wire drawing dies and substantially reduced in diameter all without annealing. The steps of this embodiment are particularly beneficial in both of these respects.

The nose 173 of the forming roll 170 is preferably spaced from the base 32 such that the thickness of the apex 174 of the split rod 175 will be slightly greater than the ultimate thickness of the ribbon to be formed.

Figure 20:
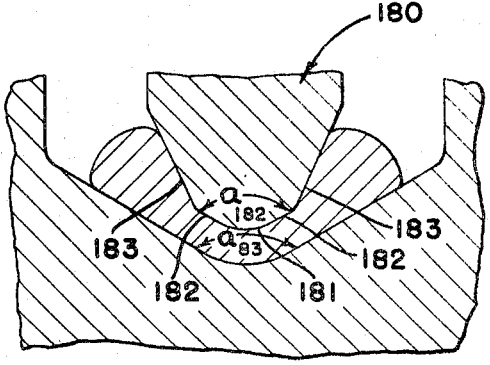

The second forming pass is shown in FIGURE 20. Here the upper forming roll 180 has an arcuate nose 181 blending tangentially into generally flat diverging side walls 182 of a predetermined width which then terminate in side walls 183 which diverge at a substantially lesser angle. The angle of divergence $a_{182}$ of the side walls 182 is the same as the angle $a_{83}$ and the center of curvature of the nose 181 coincides with the center of curvature of the apex 82 of the groove. With this arrangement it will be seen that the forming roll 180 reduces the thickness of the center portion or apex 174 of the split rod only and as the rod leaves the forming pass, this portion 174 is formed to its ultimate or final thickness. With this arrangement it is to be noted that the edges of the V are relatively thick and as there is little or no cold work being done on them while the center portion is being formed, the edges restrain the center portion from elongating longitudinally and the principal elongation of the center portion is in a transverse direction.

Figure 21:
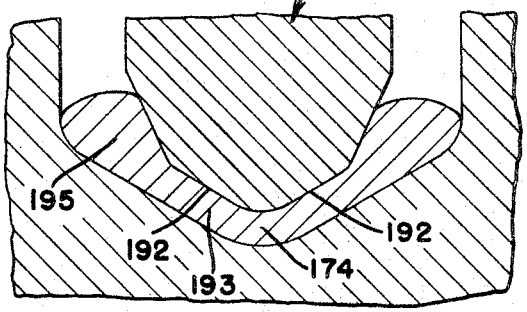

The third pass is shown in FIGURE 21. Here, generally, the upper forming roll 190 is generally identical to the forming roll 180 with the exception that its diverging side walls 192 have a greater length than the side walls 182. With this arrangement, a portion 93 of the side walls of the V outwardly from the center portion 174 are reduced in thickness and this is substantially the only portion of the rod which is reduced in thickness in this pass. With this arrangement it is to be noted that the outer edges or portions 195 of the rod are relatively thick and this thickness, along with the center portion of the V which has previously been cold worked and is therefore somewhat hardened, tend to restrain this intermediate portion 193 of the walls from elongating longitudinally and the principal elongation is in a transverse direction.

Figure 22:
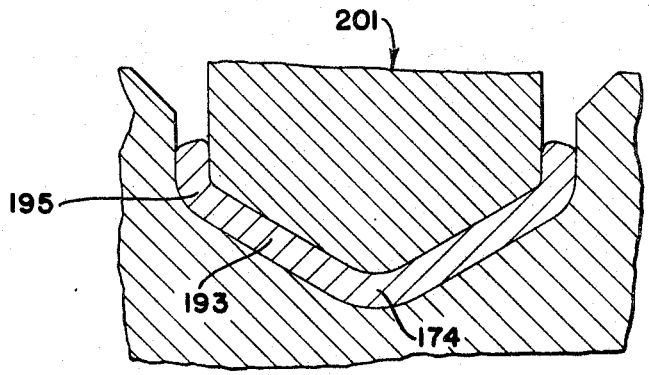

FIGURE 22 shows the final pass and in this embodiment of the invention the rolls are identically shaped to those shown in FIGURE 15 and need not be further described herein. It is to be noted, however, that the upper forming roll 201 only effects a reduction in thickness in the outermost portions 195 of the V. Here again the center portions 174 and 193 which are not reduced in this pass restrain the outer portions 195 from elongating longitudinally and the principal portion of the elongation is in a transverse direction.

With this arrangement, a maximum elongation in a transverse direction can be obtained and a maximum width of ribbon is obtained.

It is to be noted that in the forming operation shown in FIGURE 20, it may be desirable to slightly relieve the nose 181 of the upper forming roll 180 so that the reduction in thickness at the apex 174 is brought on not by a compacting of the metal there, but by a stretching in a longitudinal direction due to the longitudinal elongation of portions of the rod immediately adjacent thereto due to the cold work of the upper forming roll 180.

After the forming step of FIGURE 22, the thus-formed ribbon may be closed generally as is shown in FIGURES 16–18.

If the end product desired is a flat ribbon rather than a tube, the U or C-shaped ribbon may be rolled flat by conventional means or the final forming step may be one which reduces the edge of the member to a desired thickness while giving the ribbon the desired cross-sectional curvature.

The invention has been described with reference to preferrred embodiments only. It will be appreciated that modifications and alterations will occur to others upon a reading and understanding of this specification and it is my intention to include all such modifications and alterations insofar as they come within the scope of the appended claims.

Having thus described our invention, we claim:

1. A method of manufacturing tubular welding electrodes comprising the steps of: providing a green rod; forming such rod into a generally U-shaped ribbon of uniform thickness and width defining an upwardly facing channel and forming the ribbon into a hollow tube.

2. The method of forming metal ribbon comprising the steps of providing a metal rod of a weight per foot substantially greater than the weight per foot of the metal of the final ribbon, progressively forming a single longitudinally extending groove in such rod and thereafter widening such groove until the metal has a generally uniform thickness and a uniform width.

3. The method of claim 2 including the step of holding the rod against transverse movement while forming the groove.

4. The method of claim 2 including filling the groove with welding ingredients and then forcing the edges into abutting engagement.

5. The method of claim 2 wherein the groove divides the rod generally into the shape of a V with the thickness of the legs of the V increasing at a predetermined rate from the apex of the V and the widening of the groove comprises further forming said legs to decrease the rate of increase of the thickness of the legs from the apex until said legs and apex have a generally uniform thickness transversely from the end of one leg through the apex to the other edge.

6. A method of manufacturing a tubular welding electrode comprising the steps of: providing an elongated metal member of greater width than thickness and having parallel edges, said metal having at least some elasticity and an arcuate cross sectional shape with the edges in spaced relationship and with at least a place on the inside remote from both edges having a radius less than the radius of the place in the completed electrode; filling the arcuate shape with welding ingredients and shaping said member to both: decrease the radius of at least portions of the inside other than at said place to bring the edges into abutment, such portions during the shaping operation being in a state of compression which would normally cause the edges to separate when the shaping forces are removed; and, increase the radius of said place in an amount such that during the shaping operation said place will be in a state of tension sufficient that when said shaping forces are removed, the edges will remain in abutment.

7. The method of claim 6 wherein said place is along the longitudinal centerline of the member.

8. A method of manufacturing a metal ribbon comprising the steps of providing a rod having a cross sectional dimension in one direction greater than the ultimate ribbon thickness and rolling the rod into a ribbon by first sizing said rod and then reducing in said direction, and from one side only, the thickness of a portion only of the rod and then reducing in the same direction the thickness of other portions only until the ribbon has a generally uniform thickness and width from edge to edge.

9. A method of manufacturing a metal ribbon comprising: providing a metal rod having a generally circular cross section, and forming said rod into a ribbon with a uniform, predetermined thickness and a generally uniform, predetermined width, comprising the steps of: rigidly holding at least a place on said rod against movement in any transverse direction and changing the thickness of said rod more in at least a first portion than in at least a second portion whereby said second portion limits the longitudinal elongation of the first portion while its thickness is being changed, then changing the thickness of said second portion a greater amount than said first portion whereby said first portion tends to limit the longitudinal elongation of said second portion while the thickness of the second portion is being changed and, then changing the thickness of at least any portion of greater thickness until all portions have the same thickness.

10. The method of claim 9 wherein said first change is on the center plane of the rod and said second change is on the pair of portions on each side of said first portion.

11. In the method of forming a metal ribbon from a metal rod of generally circular cross section and having a weight per foot in excess of the weight per foot of the final ribbon; the improvement which comprises, providing a pair of forming rolls, one roll having a groove and the other roll having a nose extending toward said groove; and causing said rod to approach said rolls on a path of movement so as to become tangent with said groove prior to the point in its longitudinal movement where it is engaged by the nose.

12. The improvement of claim 11 wherein the total arc of contact with the grooved roll is at least 45° and said nose roll contacts said rod in said arc.

13. The improvement of claim 11 wherein said rod after it passes the line between the centers of said rolls, continues in contact with one of said rolls for an arc of at least 45°.

14. The improvement of claim 11 wherein the path of movement of said rod is such that it first contacts said grooved roll at a point spaced at least 45° from the line between the centers of said rolls.

15. A method of manufacturing a metal ribbon electrode comprsing the steps of providing metal rod having a greater weight per foot than the weight per foot of the ultimate ribbon, splitting said rod on a diameter into a symmertical V-shape with the apex portion of the shape being approximately the final thickness and thereafter forming the shape into a ribbon of uniform thickness and width by forming portions of the shape transversely outwardly from the apex to the final thickness progressively from the apex portion to the edges.

16. A method of manufacturing a metal ribbon comprising the steps of: providing a metal rod having a greater weight per foot than the weight per foot of the ribbon; providing first, second and last lower forming rolls, each having a generally U-shaped groove in the outer periphery thereof; providing a first upper forming roll having a periphery V-shaped in cross section but with the sides thereof forming an angle more acute than the angle of the walls of its mating groove, passing said rod through said rolls to essentially divide the rod into a partially formed generally V-shaped cross section with the legs of the V increasing in thickness from the apex thereof; providing a second upper forming roll having a periphery with a V-shaped cross section of an included angle greater than said first upper forming roll but less than that of the included angle of the walls of its mating groove, passing said partially shaped rod past said second forming rolls to reduce the thickness of said partially shaped rod but with the thickness of the legs still increasing outwardly from the apex; providing a third forming roll having a periphery with a V-shaped cross section with the included angle identical to the included angle of its mating groove and progressively passing said last mentioned partially shaped rod through said rolls to provide an arcuate ribbon of uniform cross-sectional thickness from edge to edge.

17. A method of splitting a round rod into a V-shaped cross section comprising: providing a forming roll having a U groove therein defined by a curved apex and generally flat side walls tangent with the curve of said apex, the radius of curvature of said apex being greater than the radius of said rod; providing a mating forming roll having a V-shaped nose with an included angle less than the included angle between the walls of said groove and moving said rod between said rolls and plastically deforming said rod into a V shape.

18. In combination, a pair of forming rolls for shaping a round cross-sectioned rod of a predetermined radius into a V-shaped cross section comprising upper and lower rolls, one of said rolls having a U-shaped groove defined by a curved apex and upwardly diverging generally flat side walls, the radius of curvature of said apex being less than the radius of curvature of said rod, the other forming roll having a V-shaped nose with side walls diverging from the apex at an angle less than the angle of divergence of the side walls of said groove.

19. The rolls of claim 18 wherein said rolls each have pairs of generally axially facing surfaces equally spaced from the center plane of the U groove and nose as the case may be, one pair of surfaces facing away from and the other pair facing toward said plane, the surfaces of one roll being in tight fitting engagement with the surfaces of the other roll.

20. The rolls of claim 19 wherein said surfaces have a slight taper and are in wedging engagement.

21. A steel tubular welding electrode comprised of a ribbon of a curved transverse cross section with the edges thereof disposed so as to form a closed tube, the wall of the tube varying from a purer iron on the inner, and edge surface, to a higher allow and inclusions at points spaced from said surfaces.

22. The electrode of claim 21 wherein the surfaces of the ribbon including the surfaces of the edges thereof have the same chemical composition.

23. The electrode of claim 21 wherein the surfaces of said ribbon including the surfaces of the edges have a lower alloy content than portions of the ribbon spaced from the surfaces.

24. In combination, a plurality of pairs of forming rolls for converting a rod into a V-shaped ribbon of uniform thickness comprising: at least first, second and third sets of rolls, each set of rolls including both a lower roll having a generally U-shaped groove in the periphery thereof; and an upper roll having a generally V-shaped periphery, the included angle of the sides of the V periphery of the first upper roll being less than the included angle of the sides of the U groove of the first lower forming roll by a predetermined amount, the included angle of the sides of the V periphery of the second upper roll being less than the included angle of the sides of the U groove of the second lower forming roll by a predetermined amount less than the amount of difference between the included angle of said first upper roll and the included angle of said first lower roll and the included angle of the sides of the V periphery of the last of said upper forming rolls being equal to the included angle formed by the sides of the U groove of the last of said lower forming rolls.

25. Apparatus for forming rod into ribbon comprising in combination a plurality of pairs of rolls with each pair having cooperating forming surfaces defining a throat through which the rod must pass, said throats being generally horizontally aligned and independent power means for each pair of rolls, means for independently varying the speed of said rolls, an idler roll positioned between each pair of rolls, means biasing said idler roll in a direction transverse to the line between the throats of adjacent pairs of rolls and means for changing the speed of rotation of a pair of rolls in response to the transverse position of the idler roll, said idler rolls being so positioned relative to the line between the throats of adjacent rolls that the rod after it leaves a throat continues in contact with one of the rolls forming said throat for an angle of at least 45°.

References Cited

UNITED STATES PATENTS

| | | | |
|---|---|---|---|
| 1,330,782 | 2/1920 | Brown | 72—368 |
| 1,624,340 | 4/1927 | Heinle | 72—181 |
| 2,047,873 | 3/1937 | Tytus et al. | 72—205 |
| 2,193,737 | 3/1940 | Penkala | 72—366 |
| 2,371,671 | 3/1945 | Blount et al. | 72—366 |
| 2,493,143 | 1/1950 | Ingles | 72—366 |
| 2,826,948 | 3/1958 | Veale | 72—366 |

CHARLES W. LANHAM, Primary Examiner

L. A. LARSON, Assistant Examiner

U.S. Cl. X.R.

72—205, 366; 219—146